Jan. 19, 1932.    J. L. DRAKE    1,841,716
HEAT ABSORBING MEANS FOR SHEET GLASS APPARATUS
Filed Jan. 27, 1927
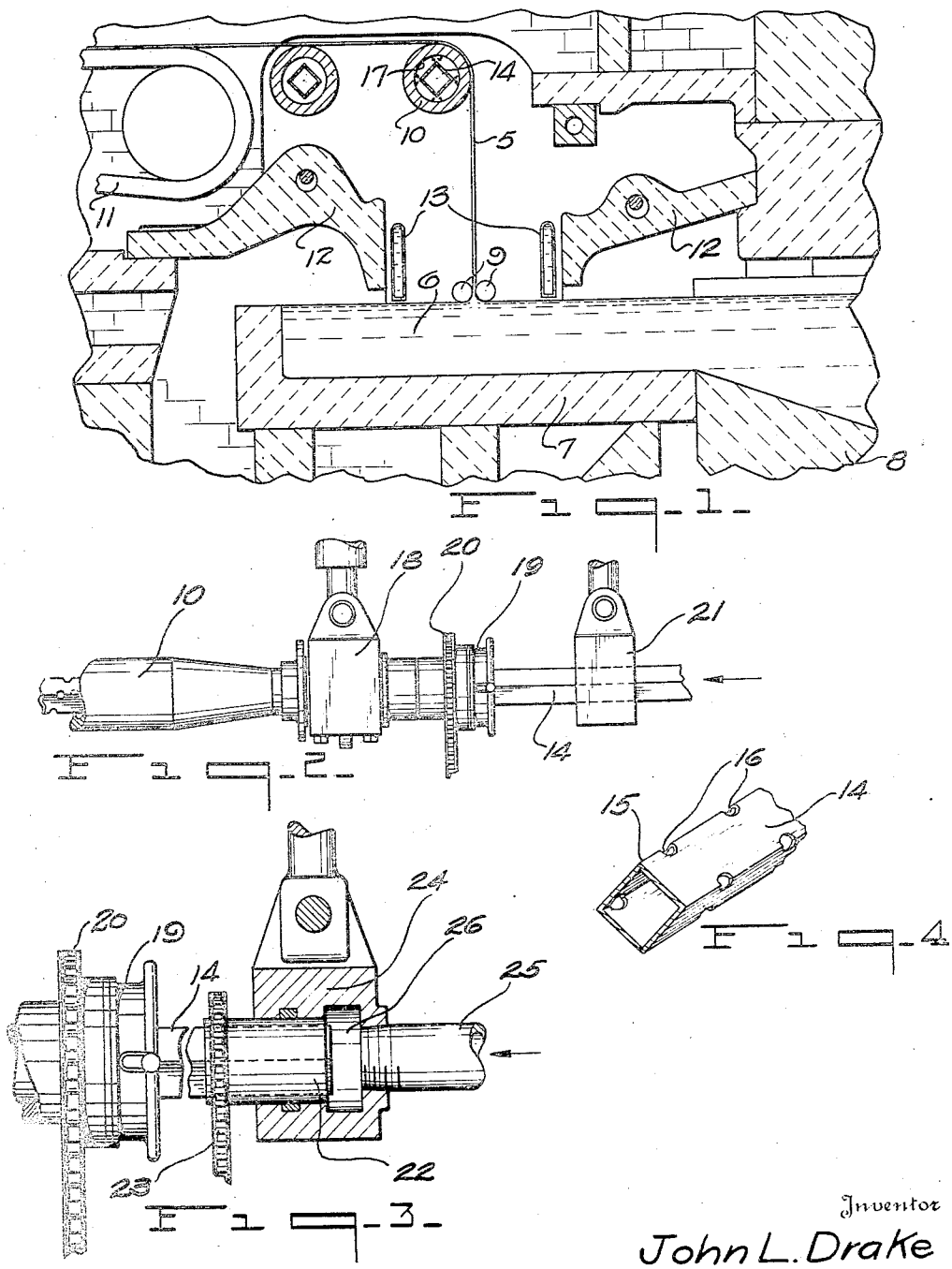
Inventor
John L. Drake
By Frank Fraser,
Attorney Patented Jan. 19, 1932

1,841,716

UNITED STATES PATENT OFFICE

JOHN L. DRAKE, OF TOLEDO, OHIO, ASSIGNOR TO LIBBEY-OWENS-FORD GLASS COMPANY, OF TOLEDO, OHIO, A CORPORATION OF OHIO

HEAT ABSORBING MEANS FOR SHEET GLASS APPARATUS

Application filed January 27, 1927. Serial No. 163,906.

The present invention relates to sheet glass apparatus, and more particularly to an improved form of cooling means.

An important object of the invention is to provide in sheet glass apparatus, means for internally cooling a member.

Another object of the invention is to provide in sheet glass apparatus, a roll, and a cooling means arranged within said roll and having portions lying closely adjacent to the inner wall of the roll, whereby air may be played upon the inner wall of the roll to absorb heat therefrom.

Another object of the invention is to provide in sheet glass apparatus, a hollow roll and an angular pipe or conduit arranged within the roll and having perforations along the corners thereof so that a cooling medium may be passed through the pipe and permitted to escape through the perforations and to act upon the inner wall of said roll to absorb heat therefrom.

A further object of the invention is to provide in sheet glass apparatus, a roll over which a semi-plastic sheet of glass may be deflected from one plane to another, the roll being adapted to have a substantially square pipe arranged therethrough, the pipe having a plurality of perforations formed along the corners thereof, the size of the pipe being such that the perforations will be arranged closely adjacent to the inner wall of the roll whereby a current of air may be played upon the said inner wall in a manner to prevent overheating of said roll when a sheet of relatively hot glass is in contact therewith.

A further and important object is to provide in sheet glass apparatus, including a rotatable roll, a substantially square pipe arranged within said roll, the corners thereof being perforated and disposed closely adjacent to the inner wall of said roll, whereby a flow of cooling medium may be applied thereto, the spaces lying between the corners affording a means of escape for the used cooling medium.

A further object of the invention is to provide in an apparatus of this nature, a substantially square heat absorbing member adapted to be rotated if desired.

Other objects and advantages of the invention will become more apparent during the course of the following description.

In the drawings wherein like numerals are employed to designate like parts throughout the same, Fig. 1 is a fragmentary vertical longitudinal section through a form of sheet glass apparatus illustrating my invention in use, Fig. 2 is a sectional detail of one form of the invention, Fig. 3 is an enlarged detail of a modification thereof, and Fig. 4 is a fragmentary perspective view of the cooling pipe.

The type of machine illustrated in the drawings is that disclosed in the patent to Colburn No. 1,248,809, granted December 4, 1917, but it is to be understood that the invention is not limited to this type of machine. In the Colburn machine a flat sheet of glass 5 is continuously drawn from a mass of molten glass 6 contained in a draw pot 7 which is continuously supplied from a tank furnace 8. The sheet 7 is drawn vertically, being held to width by means of the edge engaging means 9. The sheet is deflected from the vertical to the horizontal over a suitable deflecting means 10, whereby the sheet may be passed over the drawing and flattening means 11 and through an annealing leer which is not shown. To protect the sheet in the horizontal run from the heat and gases from the furnace, suitable lip-tiles 12 and water-cooled shields 13, are provided.

The deflecting member 10 is usually in the form of a metallic roll. Obviously, the sheet is semi-plastic when it is in contact with the roll 10, and precaution must be taken to prevent overheating of the roll, which, if permitted to occur, would result in sticking of the sheet to the roll. The speed at which the sheet can be drawn is dependent somewhat upon the ability to keep the roll 10 properly cooled. For instance, if the roll is improperly cooled and the sheet is drawn too rapidly, the roll will become hot, resulting in an improper sheet because the roll will have a serious effect upon the sheet as it is being deflected.

In accordance with the present invention, I provide a substantially square pipe or conduit 14 adapted to be arranged within the roll 10. The pipe is provided with a plurality of corners 15 in which are formed perforations or orifices 16. The orifices may be arranged in a spiral formation if desired. The size of the pipe is such that when it is placed inside of the roll 10, the corners, and consequently the openings 16, will be positioned closely adjacent the inner wall 17 of said roll. A current of air or other cooling medium may then be passed through the pipe and permitted to escape through the openings in a manner to act upon the wall of the roll and thus properly cool the same. It has been found in actual practice that this type of cooler will more efficiently cool the bending roll than any other type yet tried. After the air has passed through the openings 16 and acted upon the wall of the roll, it is passed between the roll and the flat sides of said pipe and removed from the opposite end of the roll 10. In other words, the spaces between the perforated corners of the pipe afford a means of escape for the used cooling medium.

In Fig. 2 is shown the means of mounting and driving the bending roll 10. The roll is journaled in a suitable bracket 18, the roll extending through the bracket and having connection with a suitable clutch 19 and driving means 20. In Fig. 2, the pipe 14 is rigidly mounted and is adapted to extend beyond the clutch 19 and be supported in its own bracket 21.

Fig. 3 shows a modified form wherein the cooler pipe 14 is adapted to be rotated. The end of the pipe 14 is received in a suitable bushing 22 carrying a sprocket adapted to mesh with a driving chain 23. The bushing 22 is journaled in the bracket 24, the air or other cooling medium being introduced through means of the conduit 25 communicating with the chamber 26 which also communicates with the pipe 14.

It is to be understood that the form of the invention herewith shown and described is to be taken as the preferred embodiment of the same, and that various changes in the shape, size and arrangement of parts may be resorted to without departing from the spirit of the invention or the scope of the subjoined claims.

Claims:

1. In sheet glass apparatus, means containing a mass of molten glass, means for drawing a sheet therefrom, means over which the sheet is deflected from one plane to another, and a perforated square pipe arranged within said deflecting member, and means for introducing a heat absorbing medium within said pipe.

2. In sheet glass apparatus, means containing a mass of molten glass, means for drawing a sheet therefrom, a roll over which the sheet is deflected from one plane to another, a perforated substantially square pipe arranged within said roll, and means for introducing a heat absorbing medium within said pipe.

3. In sheet glass apparatus, means containing a mass of molten glass, means for drawing a sheet therefrom, a roll over which the sheet is deflected from one plane to another, a substantially square pipe arranged within said roll, said pipe having openings formed along its corners, and means for introducing a heat absorbing medium within said pipe.

4. In sheet glass apparatus, a roll, a pipe arranged within said roll and having perforated portions arranged in close proximity to the inner surface thereof, other portions of said pipe within the roll being spaced further from the inner surface thereof than the perforated portions, and means for passing a temperature controlling medium through the perforations therein into the space between the pipe and roll, the portions of the pipe furtherest away from the inner surface of the roll cooperating therewith to provide passages for conducting the temperature controlling medium exteriorly of said roll.

5. In sheet glass apparatus, a roll, a pipe arranged within the roll, the outer surface of said pipe being non-circular in cross section, with portions of the pipe being positioned in close proximity to the inner surface of the roll and other portions a substantially greater distance therefrom, the portions of the pipe relatively close to the roll being provided with a plurality of perforations, and means for introducing a temperature controlling medium into the pipe, such medium passing through the perforations therein into the space between the pipe and roll, the portions of the pipe furtherest away from the inner surface of the roll cooperating therewith to provide passages for conducting the temperature controlling medium exteriorly of the roll.

6. In sheet glass apparatus, a roll, a pipe arranged within the roll, certain spaced portions of the pipe projecting further from the transverse center thereof than those portions intermediate the same, with the projecting portions having perforations formed therein, and means for introducing a temperature controlling medium into the pipe, such medium passing through the perforations therein into the space between the pipe and roll, the intermediate portions of the pipe cooperating with the inner surface of the roll to provide passages for conducting the temperature controlling medium exteriorly of said roll.

Signed at Toledo, in the county of Lucas and State of Ohio, this 24th day of January, 1927.

JOHN L. DRAKE.